Aug. 30, 1966 G. L. NEELY 3,269,541
DUAL ELEMENT, DUAL VALVE FILTER ASSEMBLY
Original Filed Oct. 8, 1962 2 Sheets-Sheet 1

INVENTOR
GEORGE L. NEELY
BY
ATTORNEYS

INVENTOR
GEORGE L. NEELY
BY
ATTORNEYS

United States Patent Office 3,269,541
Patented August 30, 1966

3,269,541
DUAL ELEMENT, DUAL VALVE FILTER ASSEMBLY
George L. Neely, Berkeley, Calif., assignor to Chevron Research Corporation, a corporation of Delaware
Continuation of application Ser. No. 228,912, Oct. 8, 1962. This application Apr. 1, 1965, Ser. No. 446,479
6 Claims. (Cl. 210—132)

This is a continuation of application Serial No. 228,912, filed October 8, 1962, and now abandoned.

This invention relates to filtering units for purifying fluids by removing sludge, particles of solids, carbon and the like, and particularly refers to a unit adapted to be employed in a liquid lubricant circulating system of an internal combustion engine, wherein there are positioned two filter bodies of different permeabilities or degrees of fineness with means for controllably selecting the passage of oil therethrough during an extended period of use.

Heretofore, such units have comprised a casing into which oil to be filtered was continuously pumped through one inlet and removed through a separate outlet, a suitable arrangement of fibrous or porous material being placed in the casing so that oil flowed through the interstices of the filter medium. The form of unit most frequently used at present is a cylindrical annulus having impermeable closures at both ends, permeable outer and inner cylindrical walls, and a filler or core of circumferentially pleated porous paper, mixed fibrous and porous materials, such as spun cotton fibres, wood fibres, partially bonded synthetic fibres such as rayon or similar cellulose derivatives, or coarse natural fibres such as sisal or hemp. By suitable choices, the medium may be made fine, to filter out very small particles, sludge etc., or coarse, which will pass particles up to 80-100 microns, but will retain larger particles such as chunks of carbon, core sand and the like.

Unavoidably, the fine units will ultimately become clogged so that the flow of liquid is obstructed, requiring a higher pressure differential for the same flow rate, much sooner than the coarse units. To obtain an extended useful life period, it has been proposed to use a fine and a coarse unit in parallel in the same casing, the fine unit acting to remove the finer solids and the coarser acting independently to remove the larger particles. When both units become clogged and the pressure drop therethrough exceeds about 8-12 p.s.i. a bypass valve between the inlet and outlet opens to permit substantially unfiltered oil to pass through the casing and return to the engine.

In addition, the cylindrical inner wall of such dual units for example that of the U.S. Patent No. 3,023,906, of March 6, 1962, to L. L. Moore, must be of fairly large diameter in order to provide an adequately large area for the fine or less porous element to pass liquid into the central common outlet. The space inside this wall is thus unavailable for filtering medium, so that the usable life of the unit is substantially reduced.

This invention is characterized by the novel arrangement of the position and configuration of the coarse and fine filter elements, so that the former is contained concentrically within the hitherto unused hollow cylindrical core space of the latter, and in addition, valve means are provided for selectively controlling the flow of liquid through the coarse filter element per se, dependent upon the pressure differential in the casing between the inlet and the outlet due either to oil characteristics or clogging of the fine element due to extended use and accumulation of solid particles.

In addition, there is made possible a predetermined relation between the pressure differentials at which the conventional bypass valve and the valve just mentioned will open, so as to provide the most desirable flow conditions and operating efficiency for the entire filter system.

Among the objects of this invention are:

(1) To provide an impoved dual flow filter system for internal combustion engines and the like that will give a longer useful life and a higher efficiency in use than those heretofore employed.

(2) To provide an improved filter system using a fine filter and a coarse filter in parallel between the inlet and outlet of the filter casing, with means for providing controlled sequential operation of the filter units dependent upon lubricant characteristics, changes due to temperature and upon the gradual clogging of the fine and the coarse units.

(3) To provide an improved filter system using an annular fine filter surrounding a cylindrical concentric coarse filter, with means for preventing liquid flow through the latter until a desired condition of pressure differential has been built up between the inlet and outlet of the system.

(4) To provide an improved coarse filter element of generally cylindrical configuration and including a flow control means such as a valve, adapted to be placed in existing filter casings concentrically inside of the hollow core of the annular fine filter element of the conventional type.

(5) To provide arrangements of means for controlling the direction of flow through a cylindrical coarse filter element, including a valve responsive to pressure across the unit all adapted to be placed inside of the hollow core of the fine filter element of the customary annular type, to prolong the useful life and increase the efficiency of the filtering system.

(6) To provide a coarse filter that will operate sequentially after a fine filter in parallel therewith has ceased to function so that the engine bearings in particular will be protected against large solid particles that would otherwise be circulated through the bypass valve of the present types of filter systems.

To provide an improved filter arrangement that will permit a high pressure differential to be maintained across the fine filter element without reducing the effective volume and performance of the coarse unit.

These and other objects and advantages will be further apparent from the following description of a preferred embodiment of the invention, together with alternative forms, taken in conjunction with the attached drawings, which form a part of this specification.

Figure 1:
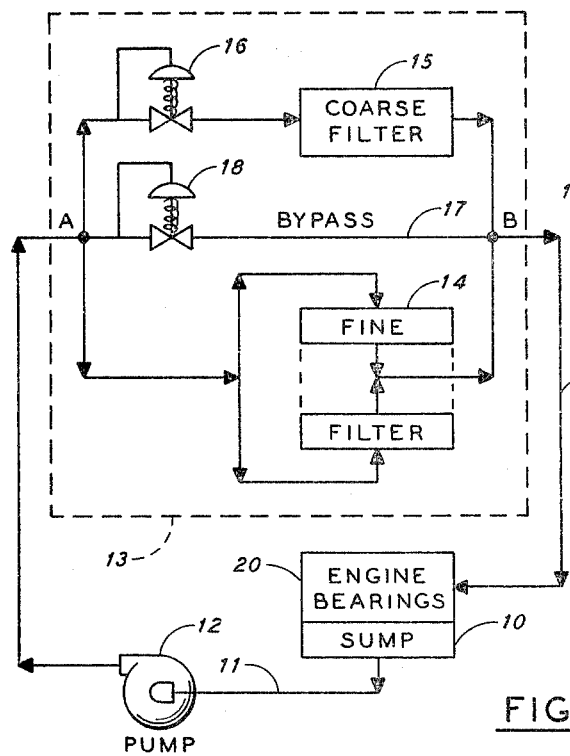
FIGURE 1 is a flow diagram showing the preferred concentric arrangement of coarse and fine filters and the flow control means therefor.

Referring to the drawings, and particularly to FIGURE 1, there is shown diagrammatically the lubricating oil circulating system for a typical engine, to which this improvement has been applied. Oil is continuously withdrawn from the sump 10 through line 11 by means of pump 12 and is delivered to the inlet A of the casing 13, indicated by the dotted square in which are contained the fine filter 14, coarse filter 15 with its control valve 16, and bypass conduit 17 with its control valve 18. From casing outlet B the filtered oil is conveyed by conduit 19 to the bearing lubricating system 20 of the engine.

There are conditions of operation, for example, when the lubricating oil in the system is very cold and viscous, so that the filters 14 and 15 offer substantial initial resistance to fluid flow, that will cause either or both valves 16 and 18 to open momentarily when the engine is started to drive pump 12. As the oil warms and its viscosity decreases, these valves will close promptly, segregating the flow in the desired manner depending on the pressure differential to which they have been set, as will be understood by one skilled in this art.

Figure 2:
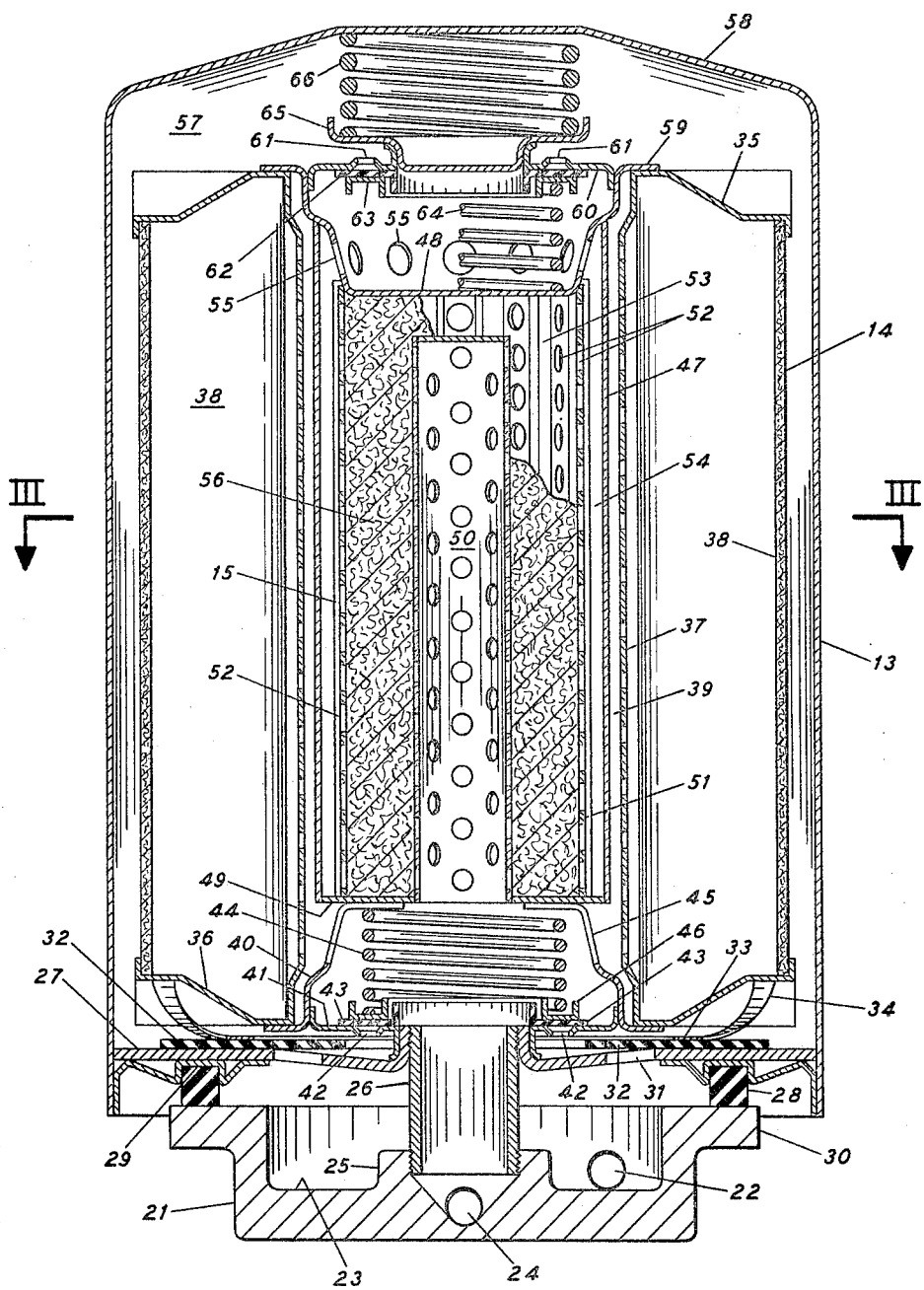
FIGURE 2 is a vertical and part longitudinal sectional view of a preferred form of a spin-on type filter casing with an annular fine filter unit and a concentric cylindrical coarse unit in place therein.

Referring now to FIGURE 2, which illustrates an example of a generally, cylindrical filter casing 13, referred to commercially as a "spin-on" unit, to which the present invention has been applied, there is positioned in the casing the usual annular fine filter unit 14. Reference numeral 21 designates a metal base or bracket to which the open end of the casing is detachably connected. An inlet port 22 continuously admits unfiltered oil from pump 12 (not shown) into a recess 23 in the bracket. An oil outlet port 24 in the wall of the bracket communicates with the inside of a threaded boss 25 carrying a threaded nipple 26 to secure the correspondingly threaded upwardly flanged bottom plate 27 of the casing 13, to the bracket 21, and to receive filtered oil from the central part of the casing inside of unit 14. A resilient ring gasket 28 is retained in an annular groove 29 formed in bottom plate 27 to seal the open end of casing 13 to the flat-faced flange 30 of bracket 21.

Around the nipple 26 there are formed a plurality of oil inlet passages 31 through bottom plate 27 over which rests a loose flat resilient ring 32, to prevent backflow of oil into recess 23 from the casing when the oil pump is stopped. Desirably, a flat ring of thin spring metal 33 overlies ring 32 and has upstanding fingers 34 to urge the resilient ring 32 against passages 31 when no flow occurs.

The annular fine filter unit 14 may be of any suitable type that has an impervious annular top end plate 35, connected to an imprevious annular bottom end plate 36 by a permeable member such as a perforated metal tube 37. Surrounding tube 37 is the fine filtering medium 38 in this example, a circumferentially pleated or deeply corrugated soft filter paper layer tightly sealed at each end to plates 35 and 36. This will retain fine particles and sludge from the unfiltered oil which enters around its outer periphery and throughout its length, and flows radially inwardly through the paper wall 38 into the hollow space 39 inside of tube 37. Alternatively, the filter medium 38 could be of packed cotton waste, rayon fibres, granular material or combinations of these and other materials, the essential feature being that it is finer and usually less permeable to liquid flow than the coarse filter unit 15, to be described below, and hence will remove smaller sized particles from the oil.

Bypass valve 17 is secured inside of tube 37 at its lower end, and, in this example, consists of an upwardly flanged ring 40 having an annular flat lower cap 41 secured thereto. Cap 41 is provided with a plurality of small circumferentially spaced passages 42 and is snugly fitted between the flanged central portion of bottom plate 27 where nipple 26 is received and the lower bottom end plate 36, to prevent undesired leakage between the incoming unfiltered oil from inlet 22 around filter unit 14 and the filtered oil inside of passage or space 39 at the lower end of tube 37 and in nipple 26. An annular flanged resilient valve member 43 overlies passages 42 and is urged against them by a relatively stiff spring 44 retained between a spider or narrow bridge 45 secured to the top of ring 40 or made a part thereof and an annular cup 46. The characteristics of the spring 44 and the areas of passages 42 are chosen so that a pressure differential of about 8 or more p.s.i. is required to lift the valve member 43 to open the bypass passage 17 formed by these elements between the inlet A and the outlet B, as these have been designated in FIG. 1.

The bypass arrangement just described is adapted to lift valve member 43 at differential pressures above 8 p.s.i. to permit unfiltered oil to pass directly from inlet 22 (point A of FIGURE 1) through normally open ports 31 and ports 42 to enter the upper end of nipple 26 and thence pass out of outlet 24 (point B of FIGURE 1). This will occur when the predetermined pressure differential between the outside and inside of fine filter 14 exceeds 8 p.s.i., for this example.

The cylindrical hollow space inside of the inner perforated wall 37 of annular filter unit 14 and between the spring retaining spider 45 of bypass valve spring 44 and the upper end of filter unit 14 is adapted to receive the cylindrical coarse filter unit 15, which will now be described.

Unit 15 has an impervious metal cylindrical outer wall or housing 47 closed at the top by an outwardly flanged cap 48 and provided with an impervious annular bottom member 49, from the center of which a perforated drain tube 50 projects upwardly and inwardly. A permeable inner wall 51 extends from the edge of the flat face of cap 48 to bottom member 49, and, in addition to perforations 52, may be longitudinally grooved or corrugated as at 53 so as to provide an annular space for unfiltered oil entering the annulus 54 at the top of housing 47 through inlet ports 55 to have access to the entire periphery of the coarse filter material 56 confined between the wall 51 and drain tube 50. Alternatively, the housing 47 could be grooved and the permeable inner wall smooth.

Means forming a differential pressure actuated inlet valve 16 (FIG. 1) are provided between the unfiltered oil space 57 inside of the upper closed end 58 of outer casing 13, and inlet ports 55 just described. In this example, cap 48 is flanged outwardly as at 59 to make a snug fit against the inner portion of the upper annular cap 35 of the outer filter unit 14. A flat annular plate 60 is secured to the top of flange 59 and is provided with a plurality of circumferentially spaced ports 61, normally closed by a resilient flanged valve member 62 urged upwardly by an annular metal cup 63 and spring 64, the latter resting upon cap 48. Above plate 60 and supported in a closed cup 65, a relatively stiff spring 66 keeps both filter units 14 and 15 pressed together and keeps the bottom face of annular unit 14 tight against bottom plate 27 of outer casing 13.

The spring 64 for the inlet valve arrangement just described for the cylindrical coarse filter unit 15, is chosen to open inlet valve 62 at a substantially lower pressure, for example 4 p.s.i. than that required to open the bypass valve 43 at the bottom of the cylindrical space inside of the annular fine filter 14. This insures that so long as the fine filter 14 will not become so clogged, or the oil so viscous that it will impose a back pressure of 4 p.s.i. between the inlet A and outlet B of casing 13, all of the oil will pass through the fine filter unit. When that pressure is exceeded, the inlet valve 62 will open and permit oil to flow through the coarse filter 15. When both filters become so clogged, or the condition of the oil is such as to interpose 8 p.s.i. or more pressure differential, bypass valve 43 opens, permitting oil to pass directly from the inlet 22 to the outlet 24 of the filter system.

Figure 4:
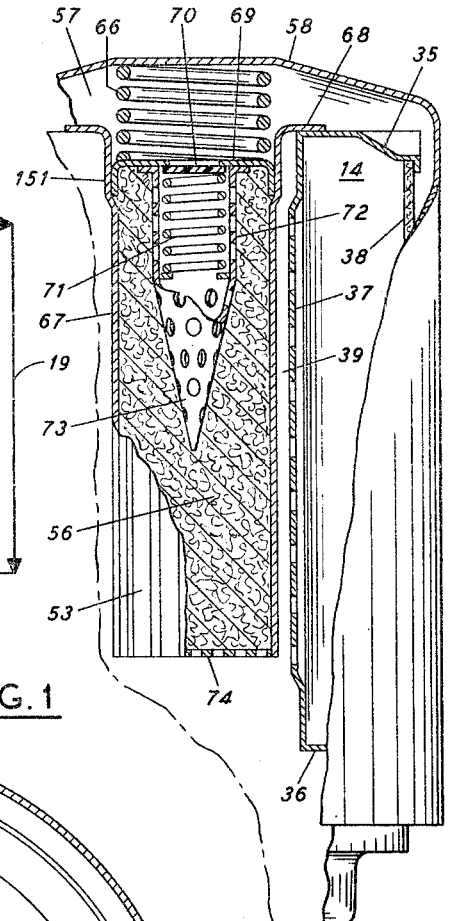
FIGURE 4 is a vertical and part longitudinal sectional view of an alternative arrangement of a coarse filter unit per se.
Figure 3:
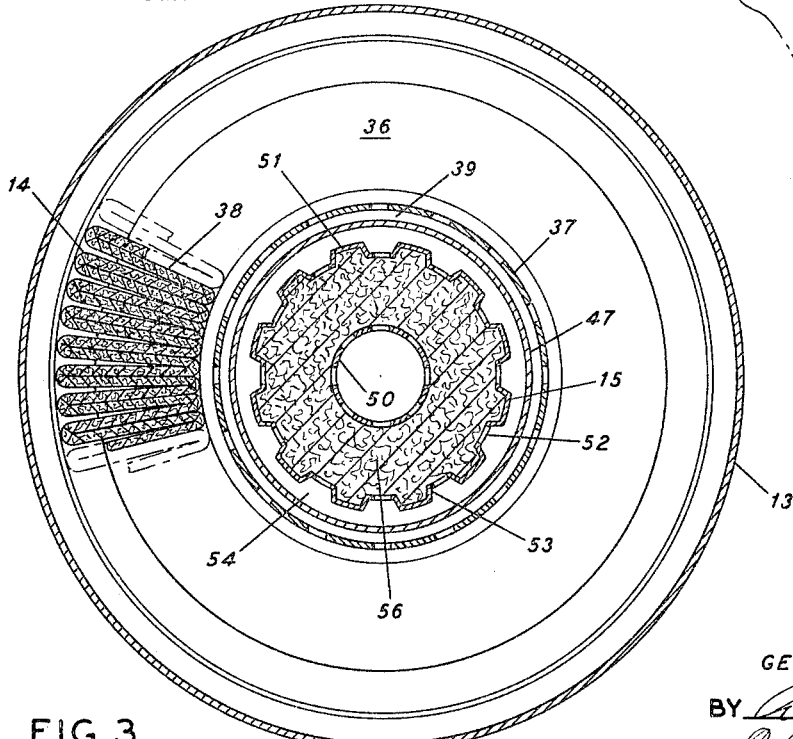
FIGURE 3 is a transverse sectional view taken on line III—III of the arrangement shown in FIGURE 2.

Referring now to FIGURE 4, there is illustrated an alternative form of coarse filter unit or cylindrical cartridge 151, which, instead of providing an inward radial flow of oil through the filter medium 56, is arranged for substantial longitudinal flow from the inlet valve at its upper end to the outlet at the bottom. In this example the cartridge has an impervious outer cylindrical wall 67 of metal or the like with an upper radial flange 68 adapted to overlie snugly the impervious upper end plate 35 of the enclosing fine filter unit 14. The outer wall 67 of the cartridge 151 is spaced from the inner perforated tube 37 of unit 14 throughout its length to form the annular passage 39 through which oil which has passed radially inwardly through the fine filter medium 38 and the perforated inner tube 37 travels to the outlet of the enclosing casing 13. In this example, the impervious wall 67 of unit 151 is longitudinally corrugated or grooved as at 53 to provide such a passage or group of passages.

The upper end of the cartridge 151 has an annular flange 69 below the center of which a flat resilient inlet valve member 70 is urged upwardly with a predetermined force by a spring 71 supported within the perforated oil distributing inlet tube 72. Desirably, this tube extends inwardly a short distance into the coarse filter medium 56, and may terminate in a conical tip 73, to afford an adequate entrance for the unfiltered oil into that medium. Due to the large interstices of the coarse filter material such an inlet will usually afford adequate distribution of incoming liquid to make maximum use of the unit.

The bottom of the cartridge 151 has a perforated plate 74, to retain the filter material 56 and to permit filtered oil to pass to the outlet of casing 13 (FIGURE 2) when valve 70 is opened by the desired predetermined pressure differential about 4 p.s.i. between the inlet 22 and the outlet 24 of that casing.

Although specific arrangements of a cylindrical coarse filter unit 15 have been described and illustrated, it is apparent that numerous changes could be made in the material of which it is made, the disposition of its inlet and outlet, the spacing means to provide the annulus 39 or annulus 54, the arrangement, location and direction of flow through the inlet valve and the means for securing the unit within the space inside of the annular fine filter unit 14, without departing from the invention herein. Accordingly, it is understood that all such changes and modifications that come within the scope of the appended claims are intended to be included thereby.

I claim:

1. A filter unit for an engine lubricating system comprising a casing having a single inlet opening and a single outlet opening concentric to said inlet opening for the lubricant being filtered, means forming a bypass directly between said single inlet and said single outlet, a valve in said bypass adapted to open at a predetermined pressure differential, an annular body of fine filtering medium in said casing, a central bore of coarse filtering medium within said annular body, impervious tubular means sealed between one end of said core and the corresponding end of said annular body, said tubular means forming separate passageways for conveying filtered lubricant from said annular body and said central core to said single outlet, means forming a passageway from said casing to a surface of said central core through said sealed end of said tubular means, and another valve for controlling passage of lubricant through said passageway to said central core, said other valve being adapted to open at a lower pressure differential than said bypass valve, whereby lubricant is admitted to said coarse filter medium from said inlet only after said fine filtering medium imposes a predetermined pressure differential to the flow of lubricant therethrough.

2. In a spin-on type lubricating oil filter unit comprising a cup member adapted to be sealed to a concentrically arranged annular supply chamber and a central discharge connection to an engine, said filter unit including an annular filter element having a permeable cylindrical wall formed of a fine filtering medium sealed between a pair of end plates, said end plates being spaced axially within said cup member to permit lubricating oil entering said cup to flow radially inwardly from said cup through said permeable cylindrical wall into a hollow cylindrical space, said cylindrical space being connected directly to the central discharge outlet in the open end of said cup member, means forming a by-pass passageway through one of said end plates to permit lubricating oil to be returned from said cup directly to said central discharge connection without requiring passage through said permeable cylindrical wall, and valve means for controlling flow of oil through said by-pass passageway when a predetermined pressure differential exists between said cup and said discharge connection, said pressure difference being due to substantial plugging of said fine filtering medium, the improvement comprising a cylindrical filter element received in the hollow cylindrical space of an annular filter element of said spin-on type engine lubricating oil filter unit, an impervious cylindrical housing adapted to be spaced radially inwardly from the inner surface of the permeable wall of the annular filter element of said filter unit, a cylindrical body of a relatively coarser filter medium than said annular element and extending axially within said cylindrical housing radially spaced inwardly therfrom, means for sealing one end of said cylindrical housing of said cylindrical body to one of the end plates sealing said annular filter element, means forming an inlet to said cylindrical body through said sealing means to permit oil to flow to one surface of said cylindrical body, means connecting the other side of said cylindrical body to the same central discharge outlet for said annular filter element, and auxiliary valve means in said inlet means to said cylindrical filter element, said auxiliary valve means being operable at a pressure less than the pressure required for the bypass valve to operate to return liquid from said cup to said discharge connection of said filter unit.

3. A filter element according to claim 2 with the addition of liquid distributing means in said cylindrical housing to direct incoming oil to the outer periphery of said cylindrical coarse filtering medium to direct oil flow radially inwardly therethrough.

4. A filter element according to claim 3 in which said liquid distributing means comprises circumferentially spaced longitudinally extending grooves between said cylindrical housing and said outer periphery of said cylindrical coarse filtering medium.

5. A spin-on type lubricating oil filter unit comprising a cup having a cylindrical wall and a closed end portion to form a casing to enclose said filter unit, an annular cover member secured to said cup adjacent its open end, means forming an inlet passage in said annular member communicating with the wall portion and the closed end of said cup, an annular filter element spaced between said closed end of said cup and said cover member so that its outer circumference is in open communication with the walls of said cup to permit direct access of oil admitted to said cup to engage the periphery of said annular filter element, biasing means between said closed end of said cup and said annular filter element to seal said filter element around a single central opening in said annular cover member, a central core filter element positioned within said annular filter element, one end of said core filter element being in direct fluid communication with the central opening in said annular cover member, said central core element including a cylindrical body of filtering material positioned within an imperforate tubular case, said case being radially spaced from the exterior circumference of said central core filter element and spaced radially inwardly from the inner circumference of said annular filter element, first pressure sensitive valve means for isolating said core filter element from said annular filter element, said valve means being positioned adjacent said closed end of said cup to control admission of oil from said closed end of said cup into said central core filter element, said valve means being operable at a first pressure in said cup, and second valve means for controlling the bypass of both said annular filter element and said core filter element to return fluid from said inlet passage directly back to said central opening in said cover member when the total pressure across both said annular filter element and said core filter element is a predetermined amount higher than said first pressure in said cup.

6. A spin-on type engine lubricating oil filter unit comprising a cup forming an external casing for said unit, a cover sealable to the open end of said cup, an annular fine filter unit adapted to fit in said cup member and axially spaced from said cover and the end of said cup, means forming an annular inlet in said cover for supplying oil to be filtered between the walls of said cup and the outer circumference of said annular filter unit, a central discharge passageway in said cover forming a single outlet for removing filtered oil from the cylindrical space within said annular filter unit, means adjacent said cover forming a bypass directly from said annular inlet to said single outlet, bypass valve means for controlling oil flow from said inlet to said outlet through said bypass, an end plate sealing the opposite end of said annular fine filter unit, means forming an inlet to the center of said annular filter unit through said end plate, auxiliary valve means in said center inlet for controlling passage of oil to be filtered directly to the center of said fine filter unit, said valve being operable under a pressure differential less than that required for opening said bypass valve means between said inlet and outlet, a tubular sleeve member sealed to said end plate and extending coaxially within said annular filter unit to define a flow space for filtered oil from said annular filter element to said single central discharge passageway in said cover, and a cylindrical filter unit of substantially coarser filtering media positioned within said tubular sleeve, said cylindrical filter unit being sealed in said sleeve to require unfiltered oil to flow through said cylindrical filter unit to pass between said auxiliary valve means and said single central outlet in said cover, said auxiliary valve means being adjusted to permit lubricating oil to flow through said coarse unit when said annular filter unit is at least partially blocked and before said bypass valve means opens because both said annular and said cylindrical filter units are blocked by accumulated deposits from said lubricating oil.

References Cited by the Examiner
UNITED STATES PATENTS

| | | | |
|---|---|---|---|
| 2,253,686 | 8/1941 | Burckhalter | 210—168 |
| 3,216,571 | 11/1965 | Whiting et al. | 210—456 X |

REUBEN FRIEDMAN, *Primary Examiner.*

F. SPEAR, *Assistant Examiner.*